United States Patent

[11] 3,559,715

| [72] | Inventor | Alfred Beattie Leslie<br>P.O. Box 8, Lowbanks, Ontario, Canada |
|---|---|---|
| [21] | Appl. No. | 846,676 |
| [22] | Filed | Aug. 1, 1969 |
| [45] | Patented | Feb. 2, 1971 |
| [32] | Priority | May 15, 1969 |
| [33] | | Canada |
| [31] | | 051,637 |

[54] TRUCK TIRE INFLATING DEVICE
7 Claims, 5 Drawing Figs.

[52] U.S. Cl............................................. 157/1
[51] Int. Cl............................................. B60c 25/00
[50] Field of Search............................. 157/1, 1.1, 1.33

[56] References Cited
UNITED STATES PATENTS

| 2,710,054 | 6/1955 | Merriman.................... | 157/1 |
| 3,013,601 | 12/1961 | Hildre........................ | 157/1.2 |

Primary Examiner—Granville Y. Custer, Jr.
Attorney—Cushman, Darby & Cushman

ABSTRACT: A safety device for preventing lockring escapement during tire inflation comprising two or more elongated jaw members which are pivotally secured in a housing mounted in a rim supporting surface such as a concrete floor. The jaw members hinge out of the housing and are held in engagement against a wheel rim, positioned over the housing, by a spreader bar which is held between its ends against the jaw members. The jaws are adapted to overlap the lockring to prevent escapement thereof and further hold the rim rigidly on the supporting surface.

PATENTED FEB 2 1971 3,559,715

TRUCK TIRE INFLATING DEVICE

This invention relates to a safety device for tire inflation and more particularly to a rim holding apparatus adapted to prevent lockring escapement.

In the repair of tires adapted with a lockring about the rim to retain the tire thereabout, it is necessary to remove the lockring to effect certain repairs to the tire. When the tire is inflated after repairs it is sometimes the case that the lockring will fly off the rim by the pressure exerted on it by the sidewall to the tire being inflated. This is due to improper mounting of the lockring or a defective ring and such a release can cause serious injuries to the repair man.

Heretofore, it has been the practice to wrap chains around the tire or to place the tire in a metal cage or to use other devices suited for special-type rims. However, some of these are time consuming to mount, do not rigidly hold the wheel in place and hinder the repair man when working on the wheel.

It is an object of the present invention to substantially overcome any of the above-mentioned disadvantages.

Accordingly from one broad aspect the present invention relates to a safety device for preventing lockring escapement during inflation of a tire secured about a rim provided with a lockring, said device comprising two or more elongated jaw members pivotally secured at one end for arcuate displacement out of a rim supporting surface, and releasable holding means for holding said elongated jaw members in a plane substantially perpendicular to said rim supporting surface in engagement against said rim to prevent ejection of said lockring and for holding said rim.

The invention is illustrated, by way of example, with reference to the accompanying drawings in which.

Figure 1:
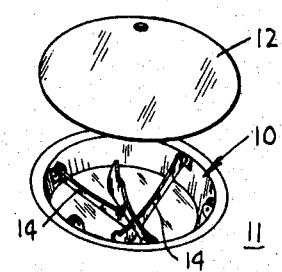
FIG. 1 is a perspective view of the device in its stored position.
Figure 2:
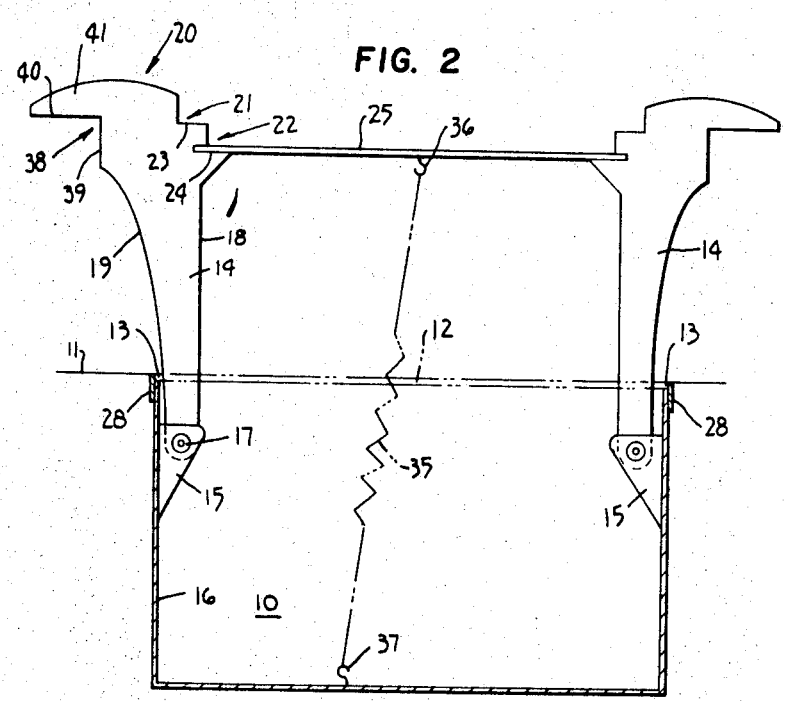
FIG. 2 is a side view, in cross section, of the device when in use.

A preferred embodiment of the invention will now be described with reference to FIGS. 1 to 5. As shown in FIG. 1 the apparatus comprises a cylindrical open-ended metallic housing 10 anchored by suitable means, not shown, in a rim supporting surface, herein shown in a concrete floor 11. A cover 12 is supported in a recess 13, provided along the upper edge of the housing 10 and terminates flush with the surface of the floor 11, thereby creating no floor hazard. The recess 13 may be formed by welding a metal ring 28 around the outside surface at the open end of the housing 10, as shown in FIG. 2.

Figure 3:
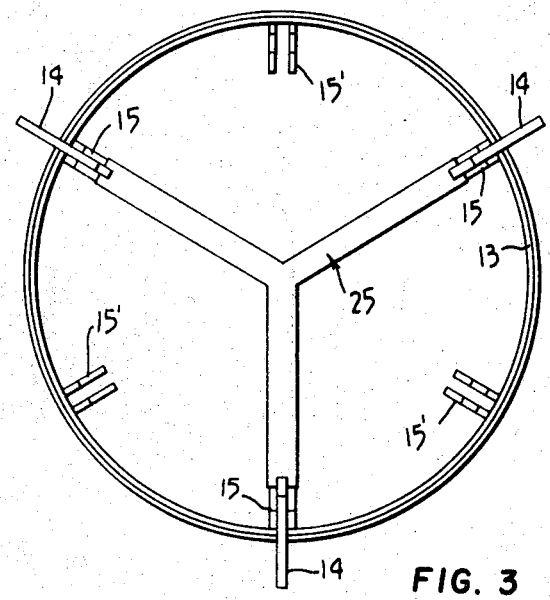
FIG. 3 is a plan view of the device when in use.

The rim retaining apparatus is contained within the housing 10 and comprises three elongated jaw members 14 pivotally secured in its lower end between a respective pair of vertically disposed flange 15 secured to the inside of the vertical wall 16 of the cylindrical housing 10. A locking pin 17 is disposed between each pair of flanges 15 and the lower end of the associated elongated jaw member 14, for pivotal movement of the latter out of the rim supporting surface 11. As shown in FIG. 3 the housing 10 is provided with a further set of three pairs of flanges 15' which may be used to retain other jaw members of different length than the first set to accommodate different size rims. Each set flanges 15 and 15', have their respective pairs of flanges equidistantly spaced, approximately 120° apart, about the vertical wall 16 of the housing 10. As shown in FIG. 1, the elongated jaw members 14 are in their stored position in the housing 10.

Figure 4:
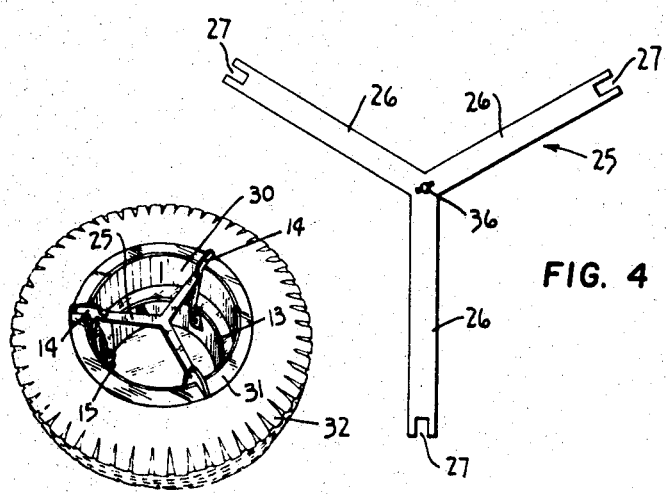
FIG. 4 is a plan view of the spreader bar.
Figure 5:
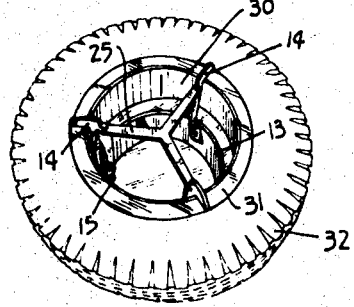
FIG. 5 is a perspective view of the device secured to a wheel.

Each jaw member 14 has a substantially straight inner edge 18 (in a major portion thereof) and a curvilinear outer edge 19, sloping outwardly from said straight inner edge 18, thereby defining an enlarged upper end portion 20. As shown in FIGS. 2 and 5, the elongated jaw members 14 are held substantially vertically out of the housing 10, when required to secure a wheel to the floor or rim supporting surface 11. The jaw members 14 are maintained and rigidly held in this position by releasable holding means herein shown as a Y-shape spreader bar 25. Referring to FIG. 4 it can be seen that the spreader bar 25 comprises three arms 26 of equal length, the free end of each having a rectangular recess 27 disposed centrally thereon for receiving a portion of an associated jaw member 14 therebetween. In order to secure in position between the elongated jaw members 14, the upper portion of the inner edge 18 of each jaw member 14 is provided with two right-angle serrations 21 and 22 each defining a supporting edge 23 and 24 respectively for accommodating different diameter size rims and spreader bar. When the spreader bar 25 is in its locking position the ends of its arms 26 will all rest either on edge 23 or 24, depending of course, on the dimension of the diameter of the rim being held by the jaw members. The rectangular recesses 27 receive a portion of an associated jaw member 14, as shown in FIGS. 2 and 3, and the bar is maintained in this position under tension by a retaining spring 35 secured between a first eyebolt 37 anchored in the floor of the housing 10 and a second eyebolt 36 secured at the center of the Y-shape spreader bar 25. As shown in FIG. 2, the spring is offset from the center of the housing not to interfere with arms when stored in the housing 10.

In order to provide engagement of the elongated jaw members with the inside of a wheel rim, for solidly retaining the wheel on the floor 11 and also to prevent lockring escapement, the upper portion of the outer edge of each jaw member 14 is provided with a right-angle rim engaging notch 38. The notch 38 defines a rim engaging edge 39 extending substantially parallel to the inner straight edge 18, and an elongated edge 40 extending perpendicular and away from the edge 39 to define an extension portion 41 for overlapping the edge of the rim 30 and the lockring 31 (see FIG. 5) when the jaw members 14 are in retaining position. Thus, a jaw is constituted between the extension portion 41 and the rim supporting surface 11 to secure a wheel rim therebetween.

In a preferred manner of operation, when a tire is to be inflated after repair, the cover 12 is removed from the housing 10 and tire 32 (see FIG. 5) is mounted on the rim 30 directly over the housing 10. After the lockring 31 is installed in its proper position on the rim 30 the jaw members 14 are pivoted so that the extension portion 41 extends over the lockring 31 and the spreader bar 25 is placed in the proper position between the jaw members 14. Should the lockring 31 be released by the pressure of the sidewall of the tire being inflated or other means, the extension portion 41 will arrest it thereby preventing it to fly off and possibly causing serious injury to the repair man. After the tire is properly inflated, the spreader bar 25 is removed, the jaw members 14 and bar 25 retracted into the housing 10 and the cover 12 replaced.

While only the preferred embodiment of the invention has been shown and described, it is not intended to be limited thereby, but only by the scope of the appended claims.

We claim:

1. A safety device for preventing lockring escapement during inflation of a tire secured about a rim provided with a lockring, said device comprising two or more elongated jaw members pivotally secured at one end for arcuate displacement out of a rim supporting surface, and releasable holding means for holding said elongated jaw members in a plane substantially perpendicular to said rim supporting surface in engagement against said rim to prevent ejection of said lockring and for holding said rim.

2. A safety device as claimed in claim 1 wherein said elongated jaw members are pivotally secured at one end in an open ended housing rigidly secured relative to a rim supporting surface, said elongated jaw members being displaceable in an arcuate path from a stored position in said housing to a rim engaging position out of said rim supporting surface for retention of a rim about said open-ended housing on said rim supporting surface.

3. A safety device as claimed in claim 2 wherein there is provided three elongated jaw members pivotally secured and equidistantly spaced in the vertical wall of said cylindrical housing.

4. A safety device as claimed in claim 1 wherein each said elongated jaw member defines a substantially straight inner edge and a curvilinear outer edge to constitute an enlarged upper end portion, one or more serrations in the upper portion of said inner edge for cooperating with said holding means, and a rim engaging notch in the upper portion of said outer edge defining an extension portion for preventing escapement of said lockring and for holding said rim.

5. A safety device as claimed in claim 1 wherein said releasable holding means is a spreader bar having a recess in each end thereof for engaging about an upper portion of an associated elongated jaw member.

6. A safety device as claimed in claim 3 wherein said releasable holding means is a Y-shaped spreader bar having three arms of equal length connected at a common point, the end of each said arms having a recess therein for engaging about an upper portion of an associated jaw member, said spreader bar being retained in engagement provided in the inner edge of each said elongated jaw member by a serration and associated with a respective end of said spreader bar.

7. A safety device as claimed in claim 6 wherein a retaining spring at one end thereof to the center of said Y-shaped spreader bar and at its other end to the floor of said open-ended housing.